US008395890B2

(12) United States Patent
Hsieh et al.

(10) Patent No.: US 8,395,890 B2
(45) Date of Patent: Mar. 12, 2013

(54) ALL-IN-ONE COMPUTER

(75) Inventors: Kun-Chi Hsieh, Taipei Hsien (TW); Li Tong, Shenzhen (CN); Xing Zhao, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 249 days.

(21) Appl. No.: 12/956,657

(22) Filed: Nov. 30, 2010

(65) Prior Publication Data
US 2012/0039037 A1 Feb. 16, 2012

(30) Foreign Application Priority Data

Aug. 11, 2010 (CN) .......................... 2010 1 0250869

(51) Int. Cl.
*H05K 7/20* (2006.01)

(52) U.S. Cl. ......... 361/679.47; 361/679.46; 361/679.48; 361/679.52; 361/695; 361/700; 165/80.3; 165/80.4; 165/104.26

(58) Field of Classification Search ........................ None
See application file for complete search history.

(56) References Cited

U.S. PATENT DOCUMENTS

| | | | | |
|---|---|---|---|---|
| 6,504,711 | B2* | 1/2003 | Wu et al. | 361/679.47 |
| 7,656,665 | B2* | 2/2010 | Lin et al. | 361/700 |
| 7,710,724 | B2* | 5/2010 | Takeguchi et al. | 361/700 |
| 7,742,295 | B2* | 6/2010 | Hata et al. | 361/679.47 |
| 8,098,490 | B2* | 1/2012 | Hata | 361/700 |
| 2005/0083658 | A1* | 4/2005 | Huang | 361/700 |

* cited by examiner

*Primary Examiner* — Boris Chervinsky
(74) *Attorney, Agent, or Firm* — Altis Law Group, Inc.

(57) ABSTRACT

A computer includes an enclosure, and a mainframe module enclosed in the enclosure. The mainframe module includes a base board defining a motherboard, a plurality of drive devices, a heat sink device and a fan thereon. The heat sink device includes a heat sink having a plurality of fins and a heat pipe. The base board is divided into a first part and a second part. The motherboard is located in the first part, and the drive devices are located in the second part. The fan is located between the first and second parts. The heat pipe transmits heat from a heat source on the motherboard to the plurality of fins. The fan blows air to the plurality of fins to cool the heat source on the motherboard.

10 Claims, 5 Drawing Sheets

ALL-IN-ONE COMPUTER

BACKGROUND

1. Technical Field

The disclosure generally relates to an all-in-one computer, especially to an all-in-one computer which can save space and still have a high heat dissipation efficiency.

2. Description of Related Art

All-in-One computers are desktop computers that combine the monitor into the same case as the CPU. A typical all-in-one computer includes a motherboard, a heat sink and a cooling fan. A plurality of heat sources (e.g., CPU, north bridge chip, south bridge chip) are attached on the motherboard. The heat sink is attached on the CPU. An outlet of the cooling fan opens towards the heat sink. Thus, airflow output from the cooling fan flows through the heat sink to dissipate heat generated by the CPU. However, the heat sink and cooling fan in the computer are both placed on the motherboard, which occupies so much space it has low heat dissipation efficiency.

Therefore there is a need for improvement in the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module," as used herein, refers to logic embodied in hardware or firmware, or to a collection of software instructions, written in a programming language, such as, for example, Java, C, or Assembly. One or more software instructions in the modules may be embedded in firmware, such as an EPROM. It will be appreciated that modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1:
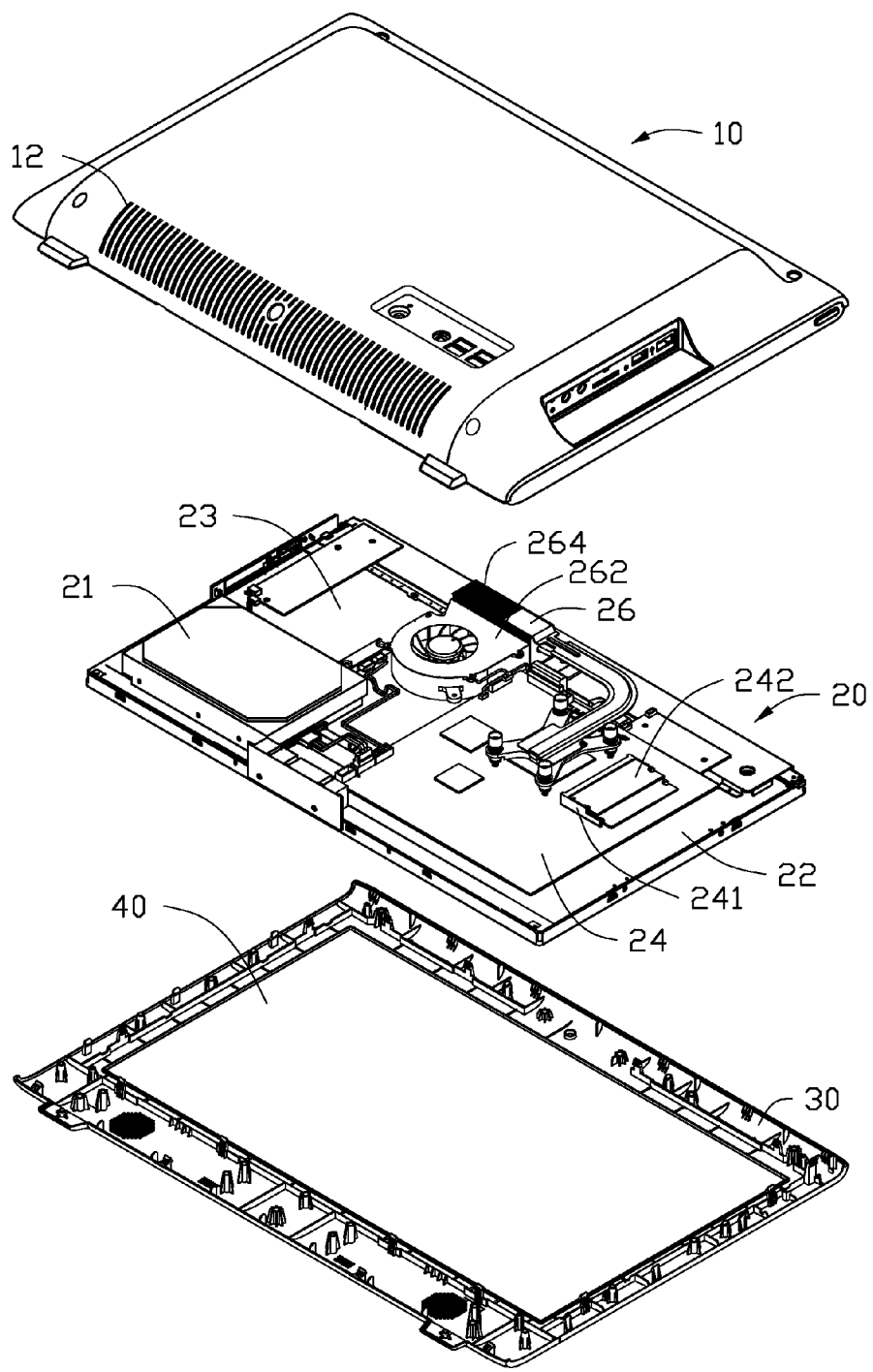
FIG. 1 is an exploded, isometric view of an embodiment of an all-in-one computer.

Referring to FIG. 1, an embodiment of an all-in-one computer includes a rear panel 10, a mainframe module 20, an enclosure frame 30, and a display module 40. The rear panel 10 and the enclosure frame 30 define an enclosure that can enclose the mainframe module 20 therein. A plurality of heating dissipating holes 12 are defined in the rear panel 10.

The mainframe module 20 includes a base board 22, a motherboard 24 attached on the base board 22, and a heat sink device 26 dissipating heat from the motherboard 24. The heat sink device 26 includes a cooling fan 262 and a heat sink 264. A hard disk drive 21 and an optical disk drive 23 are mounted on the base board 22. The base board 22 is divided into two parts: a first part and a second part. The motherboard 24 is located at the first part of the base board 22. The hard disk drive 21 and the optical disk drive 23 are located at the second part of the base board 22. The cooling fan 262 is located between the first and second parts. The cooling fan 262 can blow cooling air toward the heat sink 264 for cooling a heat source (not shown) on the motherboard 24. In one embodiment, the heat source is a CPU.

Figure 2:
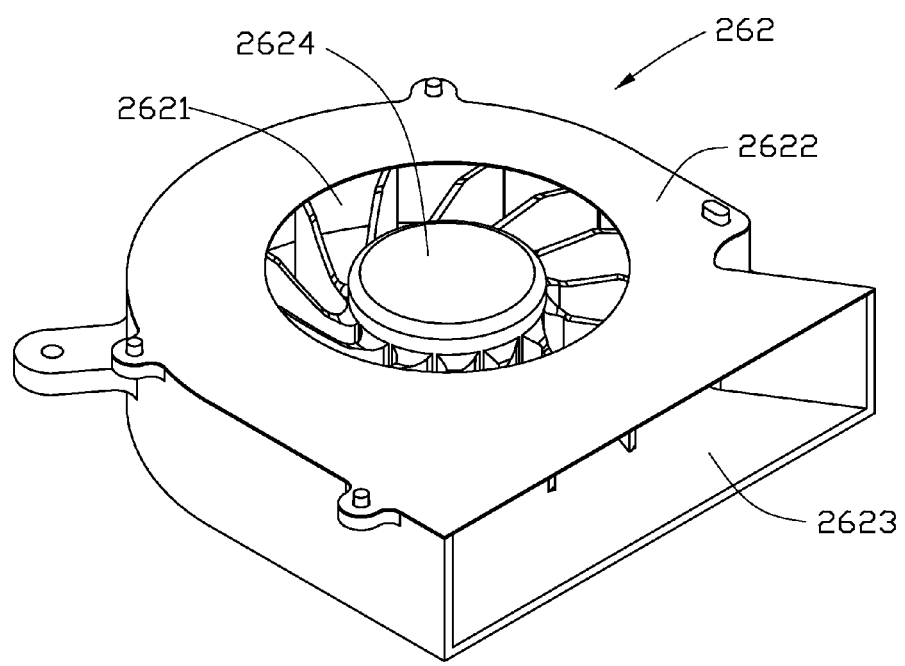
FIG. 2 is an enlarged view of a cooling fan of the embodiment of FIG. 1.

Referring to FIG. 2, the cooling fan 262 includes a shell 2622 and a rotatable fan blade module 2624. An air inlet opening 2621 is defined in a top plate of the shell 2622. The shell 2622 further has an air outlet 2623 defined at one side thereof. The air inlet opening 2621 allows air to flow into the cooling fan 262 along a vertical direction parallel to a rotating axis of the fan blade module 2624. The air outlet 2623 allows air to flow out from the cooling fan 262 along a horizontal direction perpendicular to the vertical direction.

Figure 3:
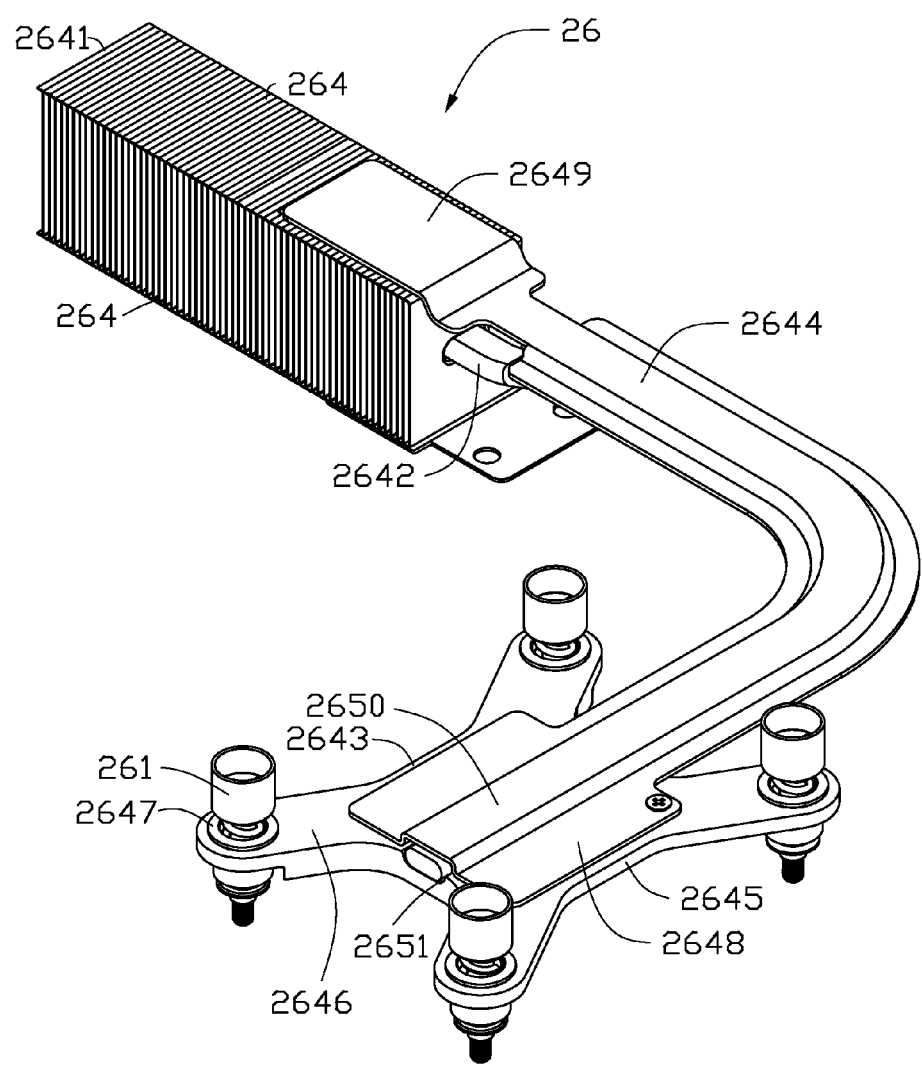
FIG. 3 is an enlarged view of a heat sink of the embodiment of FIG. 1.

Referring to FIG. 3, the heat sink 264 includes a plurality of fins 2641, a base 2643, a heat pipe 2642 connected to the plurality of fins 2641 and the base 2643, and a connection slice 2644 fixing the heat pipe 2642 onto the plurality of fins 2641 and the base 2643. The base 2643 contacts the heat source. The heat generated by the heat source is transmitted from the base 2643 to the plurality of fins 2641 through the heat pipe 2642. The heat pipe 2642 and the connection slice 2644 can be substantially L shaped. A connection slice first terminal extends to form a wider first fixing portion 2648 to fix a heat pipe first terminal onto the base 2643. A connection slice second terminal extends to form a wider second fixing portion 2649 to connect with the plurality of fins 2641. A heat pipe second terminal passes through the plurality of fins 2641. The connection slice 2644 protrudes to define a receiving portion 2650 thereon for receiving the heat pipe 2642. The base 2643 includes a body 2645 and four fixing legs 2646 extending from corners of the body 2645. A body top surface defines a cavity 2651 thereon to receive the heat pipe 2642. Each fixing leg 2646 defines a fixing hole 2647 thereon. Four fasteners 261 pass through the corresponding fixing holes 2647 to fix the base 2643 to the motherboard 24. A body bottom surface contacts a heat source top surface when the base 2643 is fixed to the motherboard 24.

Figure 4:
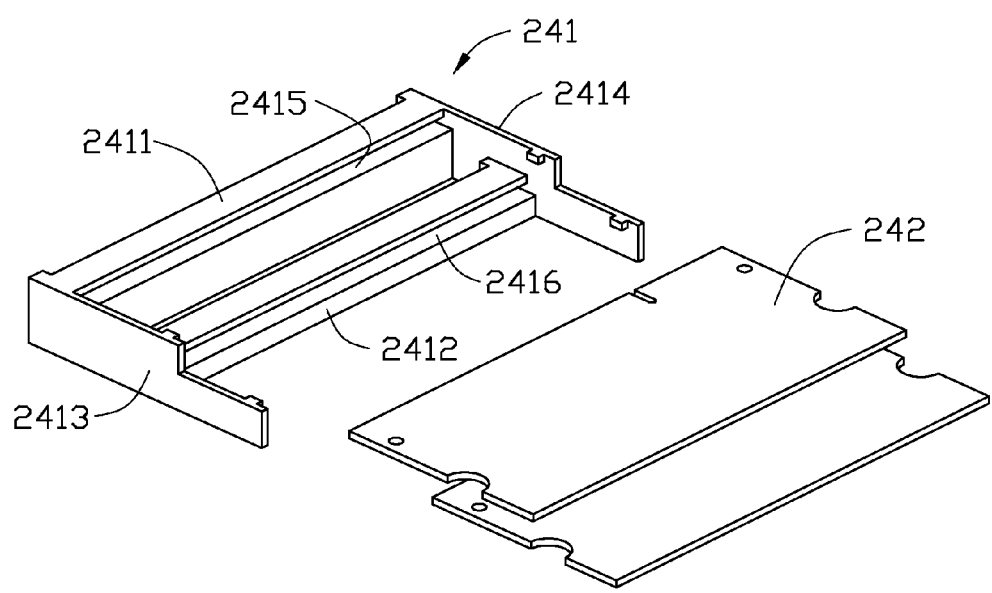
FIG. 4 is an exploded, isometric view of the memory and a memory receiving rack of the embodiment of FIG. 1.
Figure 5:
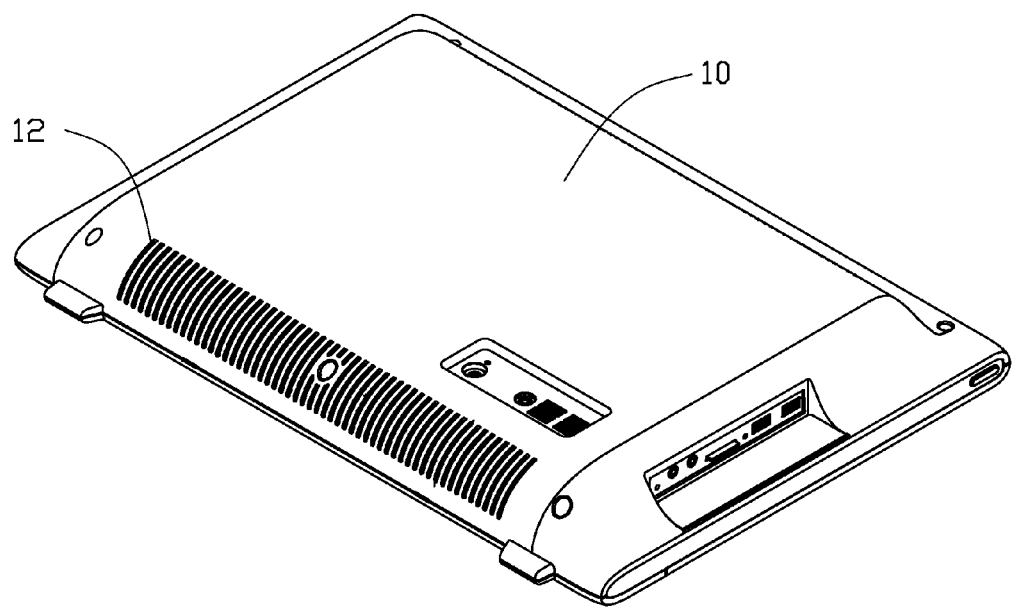
FIG. 5 is an assembled view of the embodiment of FIG. 1.

Referring to FIGS. 1 and 4, the motherboard 24 defines a memory receiving rack 241 thereon adjacent to the base 2643. Two parallel memory devices 242 are fixed on the memory receiving rack 241. The memory devices 242 are parallel to the motherboard 24. The memory receiving rack 241 includes a first fixing bar 2411, and a second fixing bar 2412 parallelly fixed on the first fixing bar 2411. The first and second fixing bars two ends extend perpendicularly to form a first side bar 2313 and a second side bar 2314. The first and second side bars 2413, 2414 define two slots 2415, 2416 thereon respectively to receive the memory devices 242.

Referring to FIGS. 1 to 5, in assembly, the heat source is fixed between the body 2645 and the motherboard 24. The mainframe module 20 is fixed between the rear panel 10 and the enclosure frame 30. When the all-in-one computer is on, the heat source generates heat. The heat generated by the heat source is transmitted to the plurality of fins 2641 by the body 2645 and the heat pipe 2642. The heat sink 264 dissipates heat generated by the heat source. The fan blade module 2624 rotates and generates airflow that flows from the air outlet 2623 to the plurality of fins 2641. The cooling fan 262 is placed between the motherboard 24, the hard disk drive 21, and the optical disk drive 23. Thus, a layout space in the computer can be saved. Furthermore, the heat sink 264 dissipates heat for the heat source through the heat pipe 2642 and the plurality of fins 2641. Therefore, the heat dissipation efficiency is further improved.

It is to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A computer comprising:
    an enclosure; and
    a mainframe module enclosed in the enclosure, the mainframe module comprising:
        a base board defining a motherboard;
        a heat sink device and a plurality of drive devices defined on the base board; wherein the heat sink device comprises a heat sink having a plurality of fins and a heat pipe; and
        a fan located on the base board; the base board is divided into a first part and a second part; wherein the motherboard is located in the first part, and the plurality of drive devices are located in the second part; the fan is located between the first and second parts; the heat pipe is configured to transmit heat from a heat source on the motherboard to the plurality of fins; and the fan is configured to blow air to the plurality of fins to cool the heat source on the motherboard.

2. The computer of claim 1, wherein the fan comprises a shell and a fan blade module enclosed in the shell; an air outlet is defined in the shell; an air inlet opening is defined in the shell that allows air to flow into the fan along a first direction; and the air outlet allows air to flow out from the fan along a second direction, that is perpendicular to the first direction.

3. The computer of claim 2, wherein the second direction is substantially parallel to the motherboard.

4. The computer of claim 2, wherein the heat sink device further comprises a base, and a connection slice for connecting the heat pipe to the plurality of fins and the base; the heat pipe passes through the heat source to transmit heat from the heat source to the plurality of fins through the heat pipe.

5. The computer of claim 4, wherein the heat pipe and the connection slice can be substantially L shaped; a connection slice first terminal extends to form a wider first fixing portion to fix a heat pipe first terminal onto the base; a connection slice second terminal extends to form a wider second fixing portion to connect with the plurality of fins; a heat pipe second terminal passes through the plurality of fins; and the connection slice protrudes to define a receiving portion thereon for receiving the heat pipe.

6. The computer of claim 4, wherein the base comprises a body and four fixing legs extended from corners of the body; a body top surface defines a cavity thereon to receive the heat pipe; each fixing leg defines a fixing hole thereon; four fasteners pass through the corresponding fixing holes to fix the base to the motherboard; and a body bottom surface contacts a heat source top surface when the base is fixed to the motherboard.

7. The computer of claim 4, wherein a memory receiving rack is defined on the motherboard adjacent to the base; two parallel memory devices are fixed on the memory receiving rack; and the two memory devices are parallel to the second direction.

8. The computer of claim 7, wherein the memory receiving rack comprises a first fixing bar, and a second fixing bar parallelly fixed on the first fixing bar; the first and second fixing bars two ends extend perpendicularly to form a first side bar and a second side bar; and the first and second side bars define two slots thereon respectively to receive the two memory devices.

9. The computer of claim 1, wherein the heat source is a CPU; and the plurality of drive devices comprise a hard disk drive and an optical disk drive.

10. A computer comprising:
    a base board defining a motherboard;
    a heat sink device and a plurality of drive devices defined on the base board; wherein the heat sink device comprises a heat sink having a plurality of fins and a heat pipe; and
    a fan defined on the base board; the base board is divided into a first part and a second part; wherein the motherboard is located in the first part, and the plurality of drive devices are located in the second part; the fan is located between the first and second parts; the heat pipe is configured to transmit heat from a heat source on the motherboard to the plurality of fins; and the fan is configured to blow air to the plurality of fins to cool the heat source on the motherboard.

* * * * *